March 7, 1944.    H. F. BRIGGS    2,343,528
WEIGHING APPARATUS
Filed April 11, 1942    5 Sheets-Sheet 1

Fig. 1.

INVENTOR
Howland F. Briggs
BY
James D. Bock
ATTORNEY

Fig. 2.

March 7, 1944. H. F. BRIGGS 2,343,528
WEIGHING APPARATUS
Filed April 11, 1942 5 Sheets-Sheet 3

Fig. 3.

INVENTOR
Howland F. Briggs
BY
James D. Bock
ATTORNEY

March 7, 1944.  H. F. BRIGGS  2,343,528
WEIGHING APPARATUS
Filed April 11, 1942  5 Sheets-Sheet 4

INVENTOR
Howland F. Briggs
BY
James D. Bock
ATTORNEY

March 7, 1944.  H. F. BRIGGS  2,343,528
WEIGHING APPARATUS
Filed April 11, 1942  5 Sheets-Sheet 5

Fig. 6.

INVENTOR
*Howland F. Briggs*
BY
*James D. Bock*
ATTORNEY

Patented Mar. 7, 1944

2,343,528

UNITED STATES PATENT OFFICE 2,343,528

WEIGHING APPARATUS

Howland F. Briggs, Buffalo, N. Y., assignor to Consolidated Packaging Machinery Corporation, Buffalo, N. Y., a corporation of New York Application April 11, 1942, Serial No. 438,526

7 Claims. (Cl. 249—15)

This invention relates to automatic scales and, in particular, to those automatic scales which are required to deliver an accurately weighed charge of material for purposes of packaging. It is well recognized that the actual weighing mechanism of an automatic scale device may be constructed to exceedingly high standards of precision. When thus constructed, the weighing mechanism may react to the positioning therein of a precise amount of material and set into motion other related devices which serve to cut off the supply of material to the weighing devices. The over-all accuracy of the automatic scale, if we assume extreme precision in the weighing mechanism, is dependent upon the manner in which the material is supplied and the manner in which the supply is cut off.

Throughout this specification, it will be assumed that the weighing mechanism is of the finest precision type and the invention here involved relates to the accurate control of the material being fed to such weighing mechanism. When the weighing mechanism has received its predetermined charge and reacts thereto, it takes a certain interval of time for the material supply to be cut off. Careful design of the cut-off mechanism will make this period of time uniform in every instance and the final accuracy of the scales comes down to the accuracy with which the material is controlled from the time cut-off is initiated until the last particle of material is positioned within the weighing devices.

It has been common practice to deliver an initial, reasonably well-controlled quantity of material to the weighing mechanism by what is commonly known as a "bulk feed." In addition to this bulk feed, there is supplied a so-called "dribble feed." The dribble feed supplies a considerably smaller stream of material than the bulk feed and careful designing will so relate the stopping of dribble feed with the reaction of the scales as to bring the ultimate weight to limits heretofore commercially satisfactory. Well designed automatic scales employing the bulk and dribble feed system are available which will deliver relatively small amounts of material weighed to an accuracy of ⅛ of an ounce.

Automatic scales have not heretofore been used in the filling of shell cases with high explosives because those commercially available were not nearly accurate enough. The present invention relates to the problem of designing automatic scales capable of delivering charges weighed to a tolerance of 1/64 of an ounce. It will be recognized that no matter how accurately the cut-off is related to the reaction of the weighing apparatus, there will be at the instant of cut-off a stream of material extending "in the air" from the discharge point of the dribble feed to the point of rest within the weigh bucket. This stream in the air must be of precisely uniform cross-section and density if it is expected to secure a final weight within the extremely narrow limits of tolerance now required.

Accordingly, it is an object of the present invention to provide in an automatic scale, material supplying devices which form a stream of precisely uniform density and cross-sectional area.

It is a further object of this invention to provide improved mechanism for cutting off the supply of material to the weighing mechanism of an automatic scale.

It is another object of this invention to provide an automatic scale capable of rapid and reliable operation within extremely narrow limits of tolerance.

It is another object of this invention to provide an automatic scale of extreme precision and of rugged and durable construction not likely to need repair or readjustment to maintain its accuracy.

It is a further object of this invention to provide a mechanism for delivering a stream of material to the weighing mechanism of an automatic scale in which the stream is manipulated to establish uniformity of density and cross-sectional area.

Other and further objects will become apparent from a consideration of the following description of the preferred but obviously not necessarily the only form of the invention.

Referring now to the drawings.

The same characters of reference refer to the same parts throughout the several views.

The automatic scale to which this invention may be applied comprises a main frame including a base 5 and supporting standards 6 connected at their upper ends by a suitable cross member 7 and supporting brackets 8 and 9 which are spaced by an additional cross member 10. Upon this main frame are supported the various elements of the automatic scale including the weighing mechanism and feed devices for supplying material to the weighing mechanism.

The weighing mechanism may be of any suitable type capable of operation within extremely narrow limits of tolerance. The mechanism illustrated in Fig. 2 comprises a balancing scale beam 12 provided with a knife edge fulcrum seated in a pivot cup 13 supported on a suitable bracket secured to the main frame. At one end, the scale beam 12 is provided with an inverted knife edge pivot 14 (see Fig. 3) on which a scale bucket 15 is suspended. Toward the other end of the beam is a similar inverted knife edge pivot 16 (see Fig. 2) on which the main weight 17 is freely suspended. It will be understood that the scale bucket 15 is provided with a conventional dump gate which is arranged to dump the finally weighed charge into a discharge hopper 18 terminating in a spout 19 beneath which the article to be filled may be positioned. Normally, the dump gate with which the weigh bucket is supplied will be power actuated to open position and arranged for automatic reclosing after each dumping operation. The dump gate mechanism has not been shown inasmuch as it does not constitute any essential part of the present invention.

Figure 3:
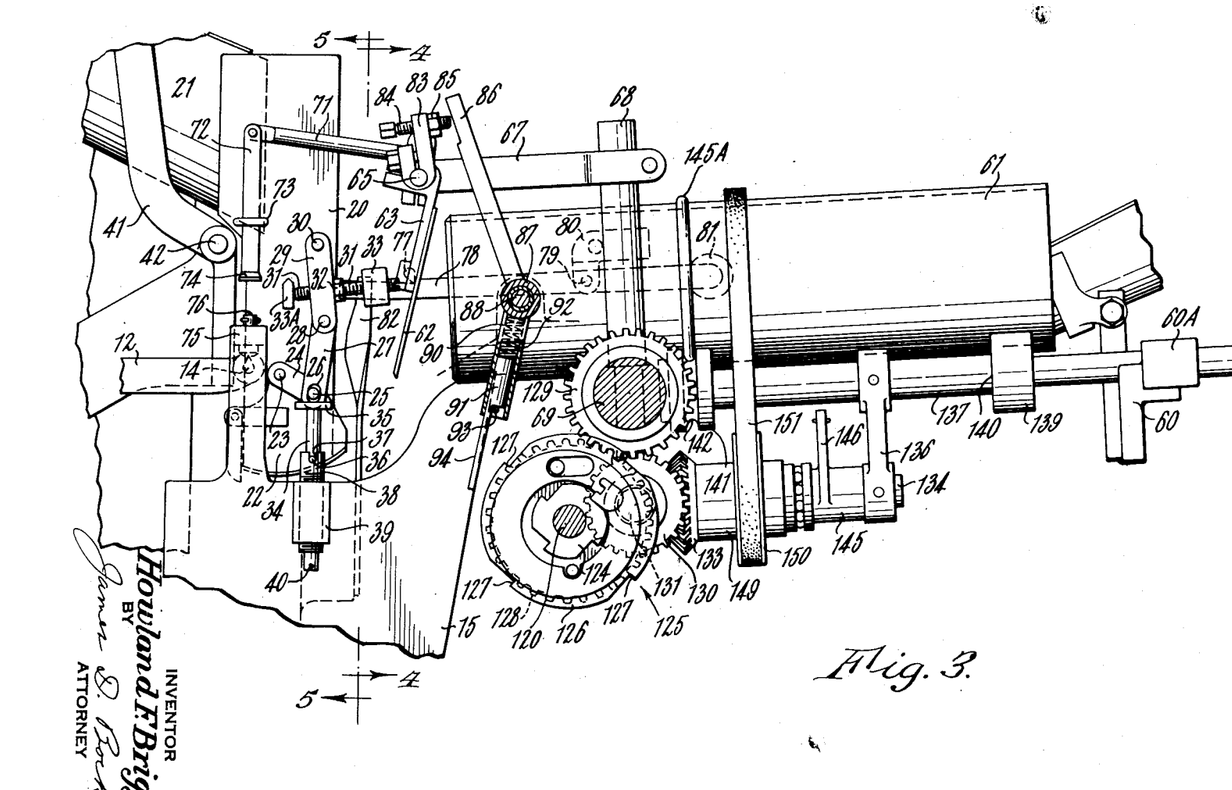
Fig. 3 is an enlarged section along line 3—3 of Fig. 1.
Figure 6:
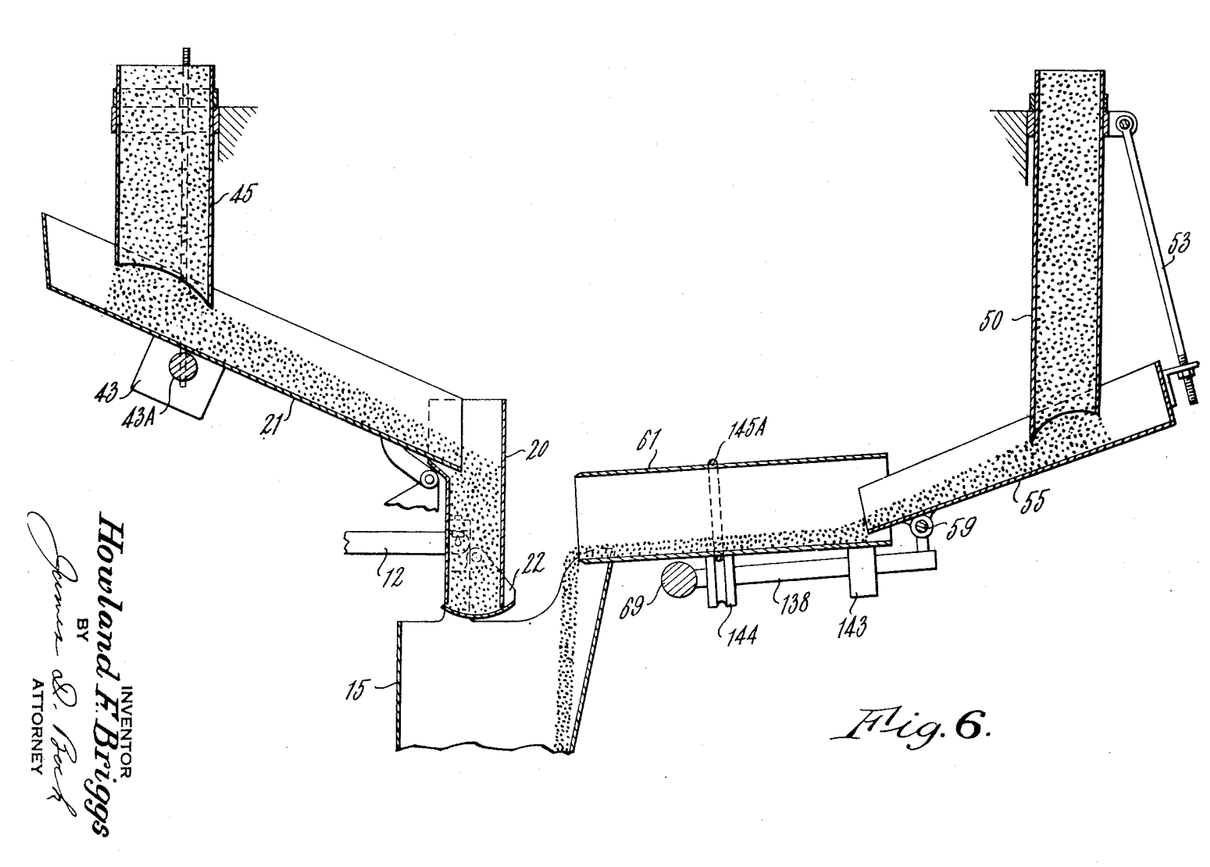
Fig. 6 is a section along the line 6—6 of Fig. 1.

Referring to Figs. 3 and 6, it will be seen that the scale bucket 15 has positioned thereover a vertically disposed box-like structure 20 communicating at its upper end with an inclined chute. The box-like structure 20 is an accumulator within which a portion of the bulk load is collected during the time that bulk feeding to the bucket 15 is not being effected. To this end, the accumulator 20 has pivoted at its lower end an arcuate gate 22 which is designed to close the accumulator 20 when bulk feeding has been sufficient to cause a preliminary dropping of the scale bucket. Thus, the gate 22 is pivoted on a pair of studs 23 located on opposite sides of the accumulator 20 and the arcuate portion of the gate 22 is concentric with the center of the studs 23. The lower end of the accumulator 20 is similarly arcuately curved in order that in the position illustrated in Fig. 3 the gate 22 will effect a tight closure. A link 24 having a pin 25 thereon is secured to the arcuate gate 22 for rotation therewith about the stud 23. The pin 25 enters a slot 26 formed in one end of a link 27 whose other end is pivoted at 28 to an end of a link 29. The other end of the link 29 is pivoted at 30 upon the accumulator 20.

Figure 5:
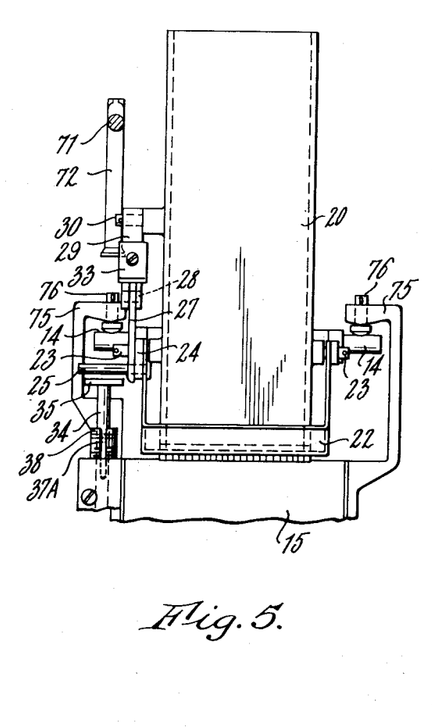
Fig. 5 is a section taken along the section line of Fig. 3 and looking in the direction of the arrows 5—5.

As shown in Fig. 5, the link 29 is relatively thick in order that it may be drilled and tapped to receive a screw 31. The screw 31 has threaded thereon a lock nut 32 and threaded or otherwise adjustably secured thereon a weight 33. The screw 31 passes through the link 29 in order that it may come into contact with an abutment 33A fastened upon the accumulator.

The mechanism just described serves to urge the gate 22 into the closed position shown in Fig. 3. It will be appreciated that the action of the weight 33 will tend to swing the link 29 in a clockwise direction and through the pivotal connection 28 to push the link 27 downwardly into contact with the pin 25 whereby to rotate the link 24 and gate 22 in a clockwise direction about the pivot studs 23. The weight 33 may be adjusted along the length of the screw 31 to vary the effective lever arm and the screw 31 may be threaded through the link 29 to a greater or lesser extent in order to vary the position of rest of the link 29 as determined by contact between the screw 31 and the abutment 33A. The screw 31 is held in its adjusted position by tightening the lock nut 32.

The particular linkage above described for closing the gate 22 insures that the action of the weight 33 will be effective to close the gate in a rapid and efficient manner. It will be appreciated that as the link 29 swings from a substantially horizontal position assumed when the gate 22 is opened to the substantially vertical position shown in Fig. 3, it will be acted upon by the weight 33. Inasmuch as the link 29 joins with the link 27 to form a toggle, the action of the weight 33 will be to initiate rapid movement of the gate toward closing position, and as the gate approaches its closing position, the toggle links 29 and 27 will be approaching a straightened position. During this phase of the operation, the gate 22 will tend to continue its movement whereby to accelerate angular movement of the weight 33. This accelerated angular movement is thus translated into an accumulated force which serves positively to close the gate. The straightened links 29, 27 also serve to maintain the gate in its closed position.

The gate 22 is opened by mechanism including a plunger 34 terminating in a flat head 35 positioned beneath the pin 25. The plunger 34 is provided with a pin 36 which is adapted to rest within a slot 37 formed in a sleeve 38 threadably received in a suitable boss 39 formed upon the bucket 15. The plunger 34 has provided at its lower end another pin 40 which prevents removal of the plunger from the adjustable sleeve 38 but which is so located as to permit the plunger to be moved vertically within the sleeve for a sufficient distance to raise the pin 36 from the slot 37 and permit the rotation of the plunger. When the pin 36 rests in the slot 37, the head 35 is held at such a level as to contact the pin 25 when the scale bucket rises to the position assumed when empty. If so desired, the sleeve 38 may have an additional slot 37A (see Fig. 5) of sufficient depth that when the pin 36 is positioned therein the head 35 will not rise sufficiently high to touch the pin 25. The mechanism just described permits of adjustment of the scale by the simple step of repositioning the plunger 34 to prevent any bulk feeding of the material to the bucket through the chute 21 and accumulator 20. This position of adjustment is adopted in any instance where the quantity of material which is to be weighed is sufficiently small to permit efficient operation using the dribble feed alone.

Figure 1:
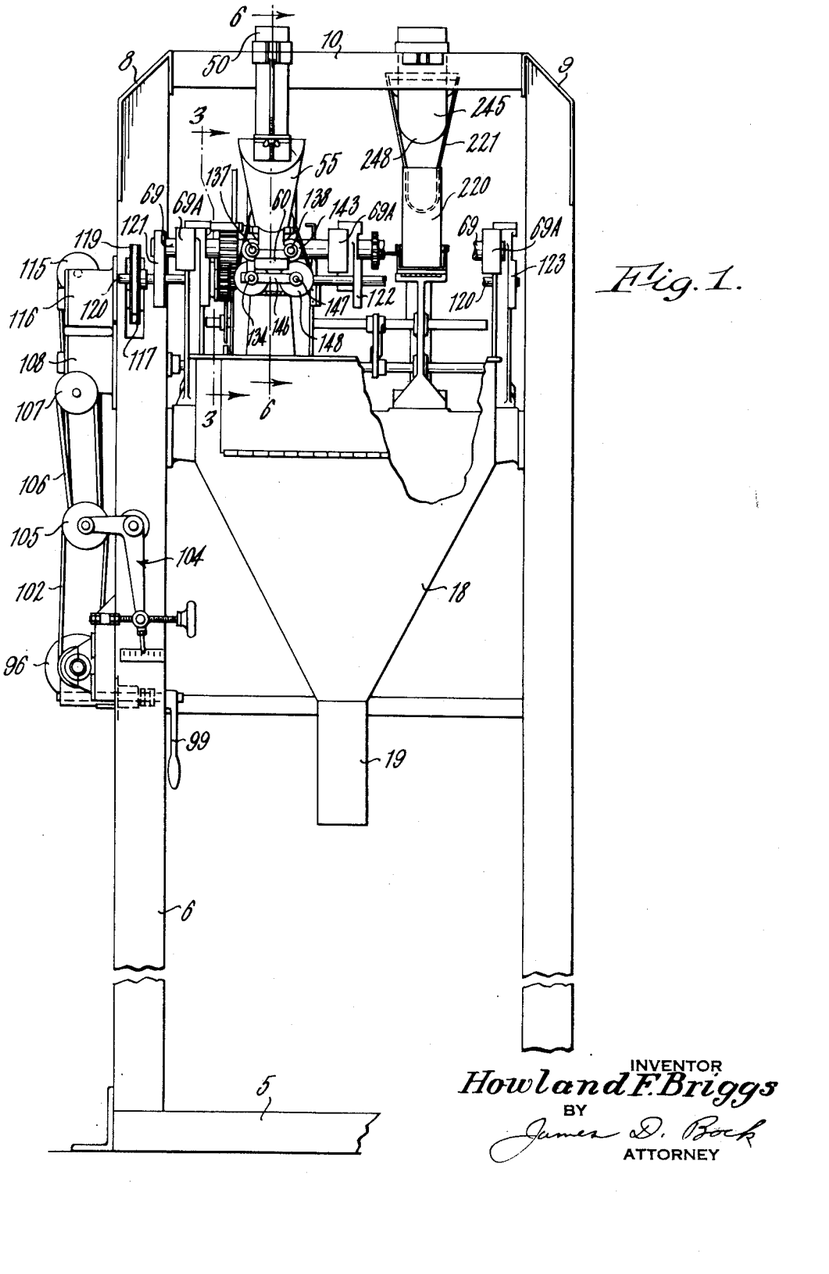
Fig. 1 is a front elevation of a machine embodying this invention.

Although it has not previously been mentioned it will be apparent that the machine illustrated in the drawings includes two complete weighing scale units. These units are identical and are actuated and controlled by continuations of the various driving shafts to be described hereinafter. In Fig. 1, the scale unit on the right-hand side of the figure has been broken away in such manner as to remove the dribble feed mechanism therefrom. This exposes the bulk feeding apparatus of the right-hand scale unit and for purposes of simplification the bulk feeding unit of the left-hand scale unit has been omitted from Fig. 1. In certain instances, there have been applied to the bulk feeding mechanism of the right-hand scale unit reference characters which are identical with the reference characters applied to the bulk feeding unit of the left-hand scale unit except that these numerals are higher by 200. Thus, the chute 21 of the left-hand scale unit is identical with the chute 221 of the right-hand scale unit. No further reference will be made to this special group of reference characters inasmuch as their relationship is obvious.

Figure 2:
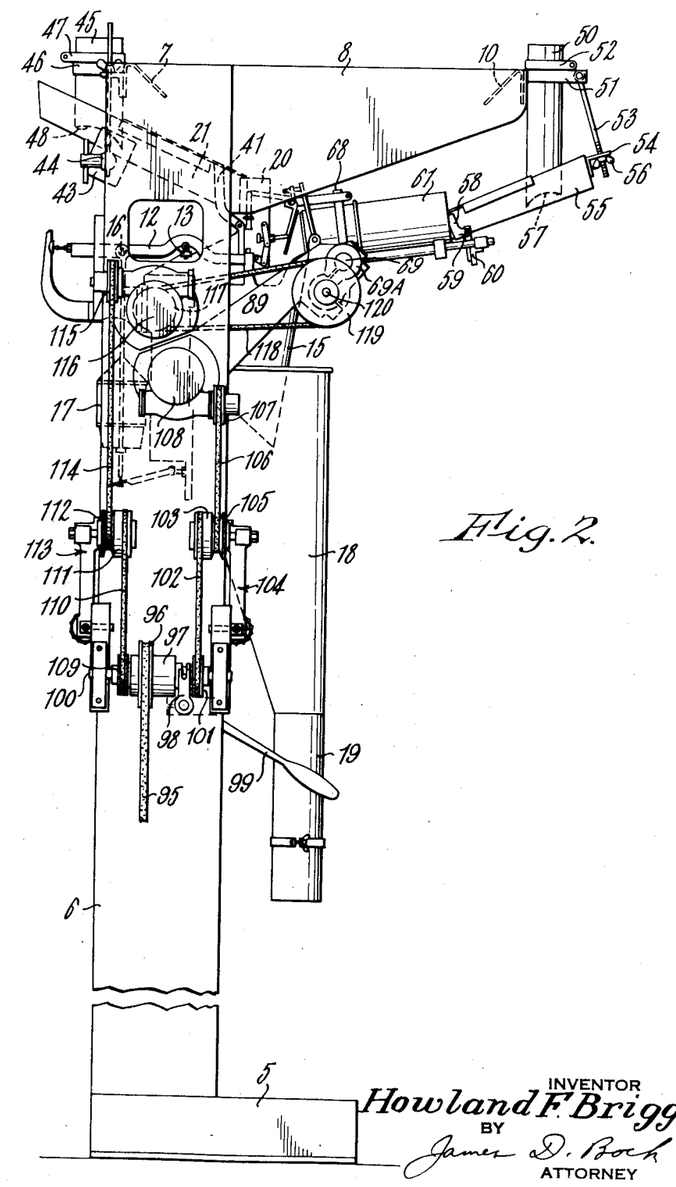
Fig. 2 is a side elevation of the same.

The bulk feeding chute 21 preferably is of semi-circular cross-section and may converge toward its discharge end to fit the accumulator 20. The chute 21 is pivotally supported upon a lever 41 resting upon suitable pivot pins 42 located adjacent the discharge end of the chute 21. In general, the chute 21 is to be arranged at an inclination suitable for the particular material being handled by the automatic scale. Provision is therefore made for adjustment of the upper or intake end of the chute in order to select the proper angle of inclination. To this end, the chute 21 rests upon a bracket 43 which serves as a cradle and is pivotally mounted upon a cross rod 43A (see Fig. 6). The ends of the cross rod are carried in adjustable supports 44 (one of which is shown in Fig. 2). It will be understood that the supports 44 may be adjusted vertically within suitable slots formed in the standards 6 and secured in adjusted position by tightening of the wing nuts forming a part of the support.

Material is supplied to the chute 21 by a vertical down spout 45 slidably received within a bracket 46 secured to the main frame. The down spout 45 may be moved vertically within the bracket 46 and secured in adjusted vertical position by a clamping ring 47. Material is supplied to the down spout 45 from any suitable source of supply as, for example, a hopper or tubing leading to a hopper. The down spout 45 is preferably cylindrical in cross-section and its lower end 48 is cut at an angle generally parallel to the angle assumed by the chute 21. The lower end 48 is also transversely contoured to conform to the semi-circular inner surface of the chute 21. As a matter of practice, the angle of the end 48 may be approximately mid-way of the range of angular adjustment through which the chute 21 may be moved. With any given material, it will be understood that the chute 21 and the down spout 45 will be mutually and relatively adjusted for proper operation. A certain vertical spacing must exist between the surface of the chute 21 and the inclined lower end of the spout 45 and this space as well as the angle of the chute 21 must be determined by experiment with the material.

The down spout and chute arrangement just described is of particular importance in achieving the objectives of this invention. As the description proceeds, it will become apparent that this same arrangement is employed in connection with the dribble feed. The advantages secured permit of an unusually well-controlled bulk feeding and also permit of a well-controlled supply of material to the dribble feeding mechanism. Insofar as the bulk feed is concerned, the mechanism just described is sufficient, whereas in connection with the dribble feed, it has been found that further and considerably more precise control must be provided.

The operation of the machine thus far described will now be briefly reviewed. In all of the figures of the drawings, the scale bucket 15 is illustrated in a partially lowered position which has been sufficient to close the gate 22 of the bulk feeding device but which is insufficient to have any effect upon the dribble feeding mechanism to be hereinafter described. If reference will be made to U. S. Patent No. 855,578, granted June 4, 1907, to G. Hoepner, there will be found one type of mechanism for temporarily arresting the scale bucket in a partially downwardly moved position. No attempt has been made herein to illustrate this mechanism inasmuch as it is old and well known. Starting with the scale bucket 15 in its uppermost position in which the head 35 of plunger 34 has pushed upwardly on the pin 25 to open the gate 22, it will be apparent that the material accumulated within the accumulator 20 will be permitted to drop into the scale bucket. Additional material will flow downwardly through the vertical down spout 45 and will gravitate down the inclined passageway defined by the chute 21. As the material gravitates downwardly, it removes itself from beneath the down spout 45 and thus permits additional material to flow therefrom. It has been found that this wiping of material from beneath the down spout results in a much more uniform flow of material than can be obtained by any arrangement within which free gravitation of the material is permitted. This is probably because the action of the present apparatus does not result in any change in density of the material within the down spout 45. There is no free falling of the material which experiment has taught to be extremely erratic.

The material flows from the discharge end of the chute 21 into the accumulator 20 and through the open lower end thereof into the bucket 15 and this operation continues until a sufficient quantity of material has been dropped into the bucket 15 to overcome the weight and inertia of the main weight 17. When this quantity of material has been deposited in the bucket, the scale beam 12 will rock about its knife edge support and the bucket 15 will move downwardly. By the operation of the apparatus disclosed in Patent 855,578, the scale beam 12 is not permitted to swing freely but is only permitted to partake of a limited movement sufficient to withdraw the head 35 to a position just out of contact with the pin 25 whereby to permit closing of the gate 22. Bulk feeding will therefore be stopped and dribble feeding will continue for a sufficient length of time to bring the total weight of material within the bucket to the amount necessary to cause a further downward movement of the bucket 15 to its final position assumed when the exact weight is achieved. During the time the dribble feeding mechanism is in operation, the bulk feeding mechanism will continue to feed at least for so long a time as is necessary to fill the accumulator 20. The material thus accumulated is available for the beginning of the next cycle and therefore the time during which the gate 22 is closed is not altogether wasted from the bulk feeding standpoint.

The dribble feeding mechanism will now be described.

A vertical down spout 50 is carried by the main frame in a manner similar to the mounting of the down spout 45 in the bulk feeding apparatus. Thus, the down spout 50 is slidably received in a ring 51 secured to the frame and a clamp ring 52 is provided to hold the spout 50 in the desired vertical position. The ring 51 also carries an elongated bolt 53 which passes through a perforation in a bracket 54 secured to a chute 55 generally similar to the chute 21 described in connection with the bulk feeding apparatus. A wing nut 56 is provided on the bolt 53 for holding the chute 55 at a desired angular position.

The chute 55 is preferably of semi-circular cross-section and converges toward its discharge end as seen in Fig. 1. The lower end 57 of the down spout 50 is shaped to conform as nearly as possible to the contour of the inner surface of chute 55. Here again, the angle of inclination of the end 57 is preferably approximately mid-way of the range of angular adjustment through which the chute 55 may be moved. Near its discharge end the chute 55 is supported by a cradle 58 secured thereto and pivoted at 59 upon a supporting bracket 60 transversely of the machine.

The down spout and chute just described operate in the same manner as the down spout 45 and chute 21 heretofore described. Normally, the down spout 50 and chute 55 will be considerably smaller than those used in the bulk feeding apparatus because they are required to deliver a much smaller quantity of material.

The discharge end of the chute 55 enters an open end of a cylinder 61 supported at a slight incline and driven for rotation about its longitudinal axis by means to be described. Preferably, the inclination of the cylinder 61 is such that the material will not flow by the action of gravity alone. When the cylinder is rotated, material introduced from the chute 55 will flow as a result of the combined action of gravity and the rotation of the cylinder. The material thus flowing through the cylinder 61 reaches the discharge end of the cylinder which is located within the mouth of the bucket 15 and flows from the discharge end into the bucket.

A gate 62 is provided for closing the discharge end of the cylinder 61 and suitable mechanism is provided for closing this gate 62 and simultaneously stopping rotation of the cylinder 61 when the scale bucket 15 drops to its final position. This mechanism will now be described.

The gate 62 comprises a disk (see Fig. 4) of a size and shape appropriate for closing the discharge end of the cylinder 61 and is secured to a bracket 63 having ears 64 into which are driven pins 65 having conical bores adapted to receive pointed screws 66 threadably supported in brackets 67. The gate 62 is thus mounted for pivotal movement about the screws 66. The brackets 67 are supported on posts 68 which are in turn supported by a cross rod 69 which extends across the machine frame. The rod 69 passes through a series of releasable clamps 69A for a purpose to be hereinafter described.

The pins 65 are preferably driven into the bracket 63 or are otherwise fixed against rotation relative to the bracket 63. To one of the pins 65 is clamped a strap 70 (see Fig. 4) into which is clamped a lever 71 (see Figs. 3 and 4). As shown in Fig. 3, the lever 71 extends to a position adjacent the accumulator 20 and has pivotally dependent from the end thereof a plunger 72 which passes through a guide eye 73 secured to the accumulator 20. At its lower end, the plunger 72 is formed with an abutment head 74. The scale bucket 15 has an upwardly extending support 75 on which is mounted a stud 76 which is in alignment with the abutment 74 and so positioned as to strike the abutment 74 as the bucket 15 moves upwardly to its position assumed when empty, and which serves to move the plunger 72 upwardly to a sufficient extent to rock the dribble gate 62 in a clockwise direction to a position away from the cylinder 61.

In order to prevent closing of the dribble gate 62 immediately that the scale bucket makes its preliminary downward movement incident to receiving an ample bulk charge, a latch mechanism is provided. This comprises a knife edged detent 77 secured to the gate bracket 63 and adapted to be received within a notch formed in a latch lever 78. The latch lever 78 is pivoted at 79 upon a bracket 80 and is provided at its rear end with a weight 81 which tends constantly to urge the lever 78 to rotate in a clockwise direction. Thus, when the gate 62 is rotated in a clockwise direction, the knife edge 77 will ride along the upper surface of lever 78 and when it reaches the notch formed therein, the weight 81 will raise the lever 78 to latch the detent 77 whereby to hold the gate 62 in open position. The lever 78 extends beyond the detent 77 and is positioned beneath a hook 82 which extends upwardly from the scale bucket 15. The hook 82 is so proportioned that it will not engage the end of the lever 78 in the initial drop of the scale bucket 15 but will engage the end of the lever when the bucket drops to its final or lowermost position. When this occurs, the lever 78 is rotated in a counterclockwise direction whereby to release the detent 77 and permit the gate 62 to close by gravity acting upon the plunger 72 and the lever 71. It will be understood that the abutment 74 on plunger 72 is simultaneously lowered to a position to be struck by the stud 76 on bucket 15 when the latter rises after discharging its accurately weighed load.

The other of the pins 65 (see Figs. 4 and 3) has clamped thereto a strap 83 threadably receiving a screw 84 which projects therethrough and may be locked in adjusted position by a lock nut 85. The screw 84 is adapted to engage the upper end of a lever 86 and to swing the lever 86 in a clockwise direction upon raising of the plunger 72 incident to raising of the scale bucket to its position assumed when empty. The lever 86 is secured to a sleeve 87 rotatably mounted upon a stub shaft 88 supported on a bracket 89 (see Fig. 2) fixed to the main frame of the machine. The sleeve 87 also has secured to it a hollow tube 90 within which is slidably received a plunger 91 urged outwardly of the sleeve by a compression spring 92 and limited in its outward movement by the abutment of a shoulder formed on the plunger 91 with a cross pin 93 secured adjacent the open end of the tube. The plunger 91 has a flat extended end 94 which forms with the lever 86 a bell crank and which serves in a manner to be described to control rotation of the cylinder 61.

Referring now to Fig. 2, a main driving belt 95 is connected with a motor or line shaft or other suitable source of power and serves continuously to rotate, through pulley 96, a clutch 97 which is operable through a yoke 98, and hand lever 99 selectively to drive a shaft 100. Obviously, the constructional details of the clutch 97 are of no consequence in the present invention and any suitable form may be employed. The shaft 100 has keyed on it a pulley 101 which drives, through a belt 102, one element 103 of a variable speed mechanism generally indicated at 104. The driven member of the variable speed mechanism is a pulley 105 which, through a belt 106, rotates a pulley 107 at the speed selected by manipulation of the variable speed device 104. The pulley 107 serves to drive a speed reducer 108, which may be of any conventional form, and the driven portion of the speed reducer 108 is connected by suitable means (not shown in detail in the drawings) with the apparatus for operating the dump gate (not shown) of the scale bucket 15. The operation of the dump gate and any other elements which may be driven by the speed reducer 108 comprises details which will vary in accordance with the type of weighing apparatus employed and it is not considered necessary to set them forth in detail herein.

At its opposite end, the shaft 100 has mounted for rotation therewith a pulley 109 which drives, through a belt 110, the elements 111 and 112 of a variable speed mechanism 113 which may be similar to the variable speed mechanism 104. The element 112 of this variable speed mechanism drives, through a belt 114 and pulley 115, a speed reducer 116 of any desired form.

The driven side of the speed reducer 116 includes a pulley 117 which, through a belt 118, drives a pulley 119 fixed upon a shaft 120. Referring now to Fig. 1, the shaft 120 extends across the machine and is supported in suitable bearing brackets 121, 122 and 123.

Referring now to Fig. 3, it will be observed that shaft 120 has secured to it the driving member 124 of a clutch generally indicated at 125. The clutch 125 includes an operating disk 126 having a series of notches 127 formed in its periphery. The driven side of the clutch 125 includes a gear 128. It is not considered necessary to describe the details of construction of the clutch 125 except that the control disk 126 is frictionally engaged with the driving side of the clutch and is constantly urged to such position as to engage the driving side of the clutch with the driven side whereby as long as the control disk 126 is permitted to rotate, the clutch will remain engaged. When the disk 126 is stopped from rotation, it separates the driven side of the clutch from the driving side whereby to stop rotation of the driven side while permitting continued rotation of the shaft 120 and the driving side of the clutch. The extension 94 of plunger 91 heretofore described is arranged to be swung into engagement with any one of the notches 127 of the control disk 126. Thus, when the screw 84 is withdrawn from engagement with the lever 86 as an incident to closing of the dribble feed gate 62, the extension 94 will enter one of the notches 127 of the clutch 125 and will serve to stop rotation of the gear 128. When the dribble gate is opened, the screw 84 will move the lever 86 in a clockwise direction to withdraw the extension 94 from its engagement with the notch 127 of the clutch 125 and thus permit the clutch 125 to become reengaged to rotate the gear 128.

The gear 128 drives a wide gear 129 (see Fig. 4) freely rotatable upon the cross rod 69. The gear 129 engages with a gear 130 fixed to a stub shaft 131 to which is also fixed a bevel gear 132. The bevel gear 132 meshes with a similar bevel gear 133 fixed to a shaft 134 which is supported at one end in the bracket 135 which is in turn carried by the cross rod 69, and at its other end in a bracket 136 (see Fig. 3) carried in freely rotatable relation upon a rod 137.

The rod 137 is fixed against rotation and is supported as a cantilever by the cross rod 69. A similar rod 138 (see Figs. 1 and 4) is similarly supported by the cross rod 69 in a position horizontally spaced from and parallel to the rod 137. At their outer ends, the rods 137 and 138 are joined by a bracket 60 having bosses 60A adapted to slide over the ends of the rods. Each of the rods 137 and 138 has freely rotatably mounted thereon a pair of rollers which serve to cradle the cylinder 61.

The rod 137 is provided with a roller 139 which preferably is a cylindrical roller resting against a shoulder 140 turned in the rod 137. If so desired, any suitable retaining device such as a collar may be used to hold the roller 139 against the shoulder 140. The rod 137 also carries a roller 141 which has a groove 142 in its periphery.

Figure 4:
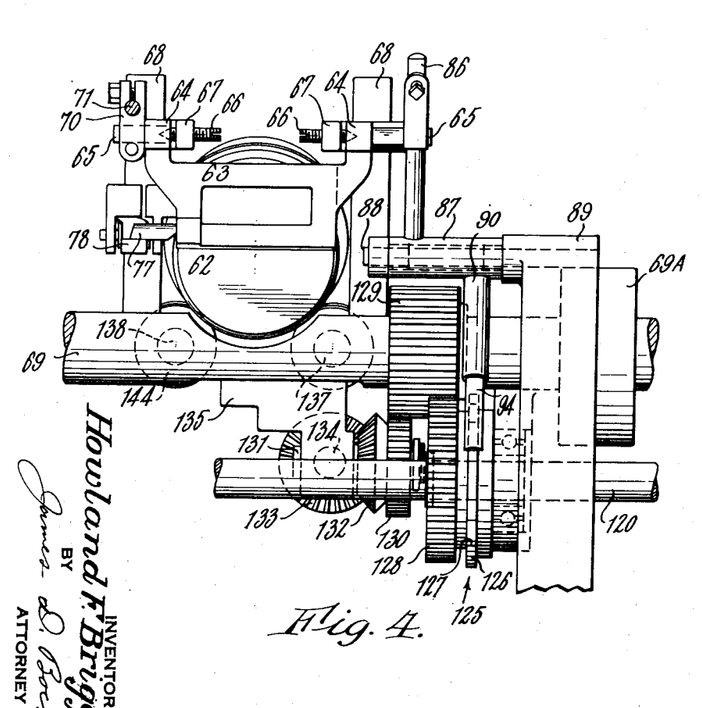
Fig. 4 is a sectional view taken along the section line in Fig. 3 in the direction of the arrows 4—4.

The rod 138 is provided with a cylindrical roller 143 (see Fig. 1) and a roller 144 having a peripheral groove therein (see Fig. 4).

The cylinder 61 has formed on its outer surface or secured thereto in any suitable manner an annular rib 145A which rests in the grooves formed in the rollers 141 and 144, respectively, to prevent longitudinally displacement of the cylinder 61.

Referring back to Fig. 3, the shaft 134 has freely rotatable thereon a hub 145 which carries a generally horizontally disposed lever 146. As shown in Fig. 1, the lever 146 carries at its opposite end a stub shaft 147 upon which is rotatably carried an idler pulley 148. The idler pulley 148 and its supporting lever 146 are free to drop under action of gravity, and if desired a spring may be added for the purpose of supplementing the force of gravity.

The bevel gear 133, which is driven for rotation by the mechanism described above including the clutch 125, is provided with an extended hub 149 which rotates therewith. The hub 149 carries a drive pulley 150 which is arranged in alignment with the idler pulley 148 previously described. A belt 151 is passed around the driving pulley 150 and beneath and around the idler pulley 148 and thence upwardly and over the top of the cylinder 61. It has been found not to be necessary to provide the cylinder 61 with any special flanges for guidance of the belt 151, but obviously such flanges could be provided if so desired.

It will be understood that the driving belt 151 is maintained under tension by the action of the idler pulley 148 and its supporting lever 146. Any supplemental action which may be desired may be secured by the use of a spring, as discussed above. The tension of belt 151 serves not only to drive the cylinder 61 but also to hold the cylinder downwardly into engagement with its supporting rollers 141, 139, 143 and 144.

The mechanism just described serves to rotate the cylinder 61 about its longitudinal axis at all times during which the clutch 125 is engaged in driving relation. Obviously, therefore, the rotation of the cylinder 61 is stopped simultaneously with the closing of the dribble gate 62 through the action of the extension 94 of plunger 91 as previously described. Similarly, rotation of the cylinder 61 is resumed upon opening of the dribble gate 62 incident to the return of the scale bucket 15 to the position which it assumes when empty.

Referring now to Fig. 6, there is illustrated a diagrammatic representation of the flow of material through the apparatus of the present invention. Referring first to the bulk feeding apparatus, the down spout 45 is illustrated as completely filled with material. As pointed out above, this material may be supplied to the down spout 45 by any suitable system. The material within the down spout 45 and beneath it on the surface of chute 21 will be under a substantially constant static head and the pressure resulting will tend to force the material from beneath the down spout. As the material flows downwardly of the chute 21, it is withdrawn by a sort of shearing or wiping action from beneath the down spout 45, and it ultimately flows in a fairly uniform stream into the accumulator 20. In the earlier stages of scale operation, the gate 22 will, of course, be opened and the material will gravitate directly and freely through the accumulator 20 into the bucket 15. When the gate 22 is closed, the material will continue to gravitate into the accumulator at least until such time as the accumulator has filled to the extent illustrated in Fig. 6. The back pressure resulting from filling of the accumulator will be progressively transmitted upwardly through the mass of material within the chute 21 and will finally overcome the static head pressure of the material within the down spout 45, and further flow will be halted.

Dribble feeding has, of course, continued throughout the bulk feeding operation. The material flows in a fairly even stream from the chute 55 into the cylinder 61.

As mentioned above, the cross rod 69 is carried in clamps 69A. These clamps may be released to permit rotation of the rod 69 about its longitudinal axis. The cantilever rods 137 and 138, the cylinder rotating means and the dribble gate 62 are all carried by the rod 69 and rotate therewith to adjust the longitudinal inclination of the cylinder 61 without disturbing the operative relation of parts. Selection of a suitable inclination is, of course, dependent upon the particular material being handled. Preferably, the inclination is so selected that the linear speed of the particles of material is progressively increased as they move through the cylinder. Thus, the stream of material is longitudinally drawn out and transversely rolled into a body of nearly perfectly uniform cross section and density. It is this uniform body of material which drops from the discharge end of the cylinder 61 and its uniformity is such as to increase the accuracy of the scales to such a point as to be entirely satisfactory for the automatic filling of shell cases with high explosives. One common type of high explosive is smokeless powder which is formed into cylindrical pellets and the machine of this invention has been particularly successful in the handling of this material.

As explained above, the dribble feed gate 62 closes and the cylinder 61 ceases rotation at the proper time. The gravitation of material downwardly of the chute 55 will continue until the excess of material deposited in the now stationary cylinder 61 is sufficient to progressively stop the flow. Inasmuch as the dribble feed operation starts with the beginning of a new cycle, there is ample time within which the excess of material may be discharged from the chute 55 and cylinder 61 and within which uniformity may be reestablished before bulk feeding is complete.

The mechanism above described has been set forth in detail as required by the patent statutes and represents a preferred form of embodiment of this invention. It is obvious that modifications and variations may be resorted to by those skilled in the art without departing from the scope of the following claims.

I claim:

1. In an automatic weighing machine having a scale bucket supported by a balance arm and arranged for descent on the positioning of a predetermined quantity of material in said scale bucket; the combination of bulk feeding means for supplying material to said bucket at a relatively rapid rate; means operable by initial reaction of said bucket for stopping said bulk feeding means; and a dribble feed mechanism including a discharge orifice through which material is discharged by static pressure; a gravity feed chute to which material from said discharge orifice is introduced; a rotatable feeding tube to which material is conducted by said gravity feed chute; means for supporting said tube in a longitudinally inclined position and means for driving said rotatable tube whereby to feed material through said tube at a rate so proportioned to the rate of flow of material from said gravity feed chute as to accelerate the particles of said material and consolidate them into a relatively more rapidly moving stream of substantially perfectly uniform cross-section and density; a gate adjacent the discharge end of said feeding tube and adapted selectively to be moved from a position for closing the discharge end of said feeding tube and to a position permitting discharge of said stream from said tube into said bucket to bring the weight of material in said bucket to a predetermined amount; and means operative thereupon to close said gate and stop rotation of said rotatable feeding tube, the material then remaining in freely falling condition from said rotatable tube to said bucket comprising a definite portion of said stream of substantially perfectly uniform cross-section and density.

2. In a material-supplying device for weighing machines and the like, the combination of a substantially vertically disposed down spout to which material to be weighed is supplied; an inclined gravity feed chute for conducting material from said down spout to a discharge point, said feed chute being transversely curved to urge said material into a solid stream positioned centrally of the transverse curvature of said chute, said down spout having its discharge end shaped substantially to conform with the contour of the inner surface of said feed chute; and means for securing said down spout in spaced relation to said feed chute whereby to provide a predetermined and approximately uniform space between the entire lower edge of said down spout and the inner surface of said feed chute through which material supplied to said down spout may be discharged by the pressure exerted by the material within said down spout.

3. In a material-supplying device for weighing machines and the like, the combination of a substantially vertically disposed down spout to which material to be weighed is supplied; an inclined gravity feed chute for conducting material from said down spout to a discharge point, said feed chute being transversely curved to urge said material into a solid stream positioned centrally of the transverse curvature of said chute, said down spout having its discharge end shaped substantially to conform with the contour of the inner surface of said feed chute; means for securing said down spout in spaced relation to said feed chute whereby to provide a predetermined and approximately uniform space between the entire lower edge of said down spout and the inner surface of said feed chute through which material supplied to said down spout may be discharged by the pressure exerted by the material within said down spout for gravitation downwardly of said inclined feed chute; and means for adjusting the inclination of said chute whereby the rate of gravitation of said material downwardly thereof will be substantially equal to the rate of discharge of material through said space between said down spout and said feed chute.

4. In a material-supplying device for weighing machines and the like, the combination of a substantially vertically disposed down spout to which material to be weighed is supplied; an inclined gravity feed chute for conducting material from said down spout to a discharge point, said feed chute being transversely curved to urge said material into a solid stream positioned centrally of the transverse curvature of said chute, said down spout having its discharge end shaped substantially to conform with the contour of the inner surface of said feed chute; means for securing said down spout in spaced relation to said feed chute whereby to provide a predetermined and approximately uniform space between the entire lower edge of said down spout and the inner surface of said feed chute through which material supplied to said down spout may be discharged by the pressure exerted by the material within said down spout for gravitation downwardly of said inclined feed chute; a rotary feeding tube adapted to receive the material flowing from said chute; and means for rotating said tube whereby to form the material introduced therein into a stream of substantially perfectly uniform cross-section.

5. In a material-supplying device for weighing machines and the like, the combination of a substantially vertically disposed down spout to which material to be weighed is supplied; an inclined gravity feed chute for conducting material from said down spout to a discharge point, said feed chute being transversely curved to urge said material into a solid stream positioned centrally of the transverse curvature of said chute, said down spout having its discharge end shaped substantially to conform with the contour of the inner surface of said feed chute; means for securing said down spout in spaced relation to said feed chute whereby to provide a predetermined and approximately uniform space between the entire lower edge of said down spout and the inner surface of said feed chute through which material supplied to said down spout may be discharged by the pressure exerted by the material within said down spout for gravitation downwardly of said inclined chute; a rotary feed tube adapted to receive material discharged from said feed chute; and means to rotate said feeding tube to cause feeding of material therethrough at a rate of speed such that the particles forming said material are individually moved at a rate of speed greater than that assumed in said gravity feed chute whereby the material is longitudinally drawn out and transversely rolled into a stream of substantially perfectly uniform cross-sectional area and density.

6. In an automatic weighing machine having a scale bucket supported by a balance arm and arranged for descent upon the positioning of a predetermined quantity of material in said scale bucket; the combination of bulk feeding means for supplying material to said bucket at a relatively rapid rate; means operable by initial reaction of said bucket for stopping said bulk feeding means; and a dribble feed device including a substantially vertically disposed down spout to which material to be weighed is supplied, an inclined gravity feed chute for receiving a material from said down spout, said feed chute being transversely curved to urge said material into a solid stream positioned centrally of the transverse curvature of said chute, said down spout having its discharge end shaped substantially to conform with the contour of the inner surface of said feed chute, means for securing said down spout in spaced relation to said feed chute whereby to provide a predetermined and approximately uniform space between the entire lower edge of said down spout and the inner surface of said feed chute through which material supplied to said down spout may be discharged by the pressure exerted by the material within said down spout, a rotatable feeding tube to which material is conducted by said feed chute, means for driving said rotatable tube whereby to feed material through said tube at a rate so proportioned to the rate of flow of the material from said feed chute as to accelerate the particles of said material and consolidate them into a relatively more rapidly moving stream of substantially perfectly uniform cross-section and density, and means operative when said dribble feed mechanism has brought the weight of material in said bucket to a predetermined amount to stop the flow of material from said dribble feed mechanism, the material then remaining in freely falling condition from said dribble feed mechanism to said bucket comprising a definite portion of said stream of substantially perfectly uniform cross section and density.

7. In a material-supplying device for weighing machines and the like, the combination of a substantially vertically disposed down spout to which the material to be weighed is supplied; an inclined gravity feed chute for conducting material from said down spout to a discharge point, said feed chute being transversely curved to urge said material into a solid stream positioned centrally of the transverse curvature of said chute, said down spout having a discharge end shaped substantially to conform with the contour of the inner surface of said feed chute; releasable means for securing said down spout in spaced relation to said feed chute whereby to provide a predetermined and approximately uniform space between the entire lower edge of the said down spout and the inner surface of said feed chute through which material supplied to said down spout may be discharged by the pressure exerted by the material within said down spout for gravitation downwardly of said inclined feed chute, said releasable means permitting adjustment of said down spout relative to said feed chute to provide differing predetermined space for discharge at different rates of said material; and means for adjusting the inclination of said chute whereby the rate of gravitation of said material downwardly thereof may be made substantially equal to the rate of discharge of material through the selected predetermined space between said down spout and said feed chute.

HOWLAND F. BRIGGS.